United States Patent

[11] 3,632,167

[72] Inventor Donald Sinfield
       Oleny, England
[21] Appl. No. 4,634
[22] Filed Jan. 21, 1970
[45] Patented Jan. 4, 1972
[73] Assignee Universal Oil Products Company
       Des Plaines, Ill.

[54] VEHICLE SEATS
       6 Claims, 3 Drawing Figs.
[52] U.S. Cl. ..................................... 297/307,
       297/321, 297/361, 248/423, 248/419
[51] Int. Cl. ..................................... B60n 1/00
[50] Field of Search ............................ 297/313,
       320, 321, 307, 309, 301, 302; 248/423, 419, 396,
       394, 399, 373, 376, 386

[56] References Cited
       UNITED STATES PATENTS
2,134,135  10/1938  Lefevre ..................... 248/423 X
2,179,085  11/1939  De Rose ..................... 248/394
2,430,656  11/1947  Wright ....................... 248/419
2,562,041   7/1951  Keller ....................... 297/307
2,636,544   4/1953  Hickman ..................... 297/308
3,075,736   1/1963  Freedman .................... 248/419 X
3,098,676   7/1963  Simons ...................... 297/307
3,109,621  11/1963  Simons ...................... 297/308 X
3,163,466  12/1964  Radke ....................... 297/320
3,466,088   9/1969  Flint ....................... 297/340 X Primary Examiner—Francis K. Zugel
Attorneys—James R. Hoatson, Jr. and Philip T. Liggett ABSTRACT: A seat for vehicles in which both a seat part and a back part are resiliently mounted in a frame to damp the transmission of vibration from the vehicle to the occupant of the seat. The seat part moves both vertically and pivotally about a horizontal axis.

INVENTOR:
Donald Sinfield

BY: James P. Hoatson, Jr.
Philip T. Liggett
ATTORNEYS

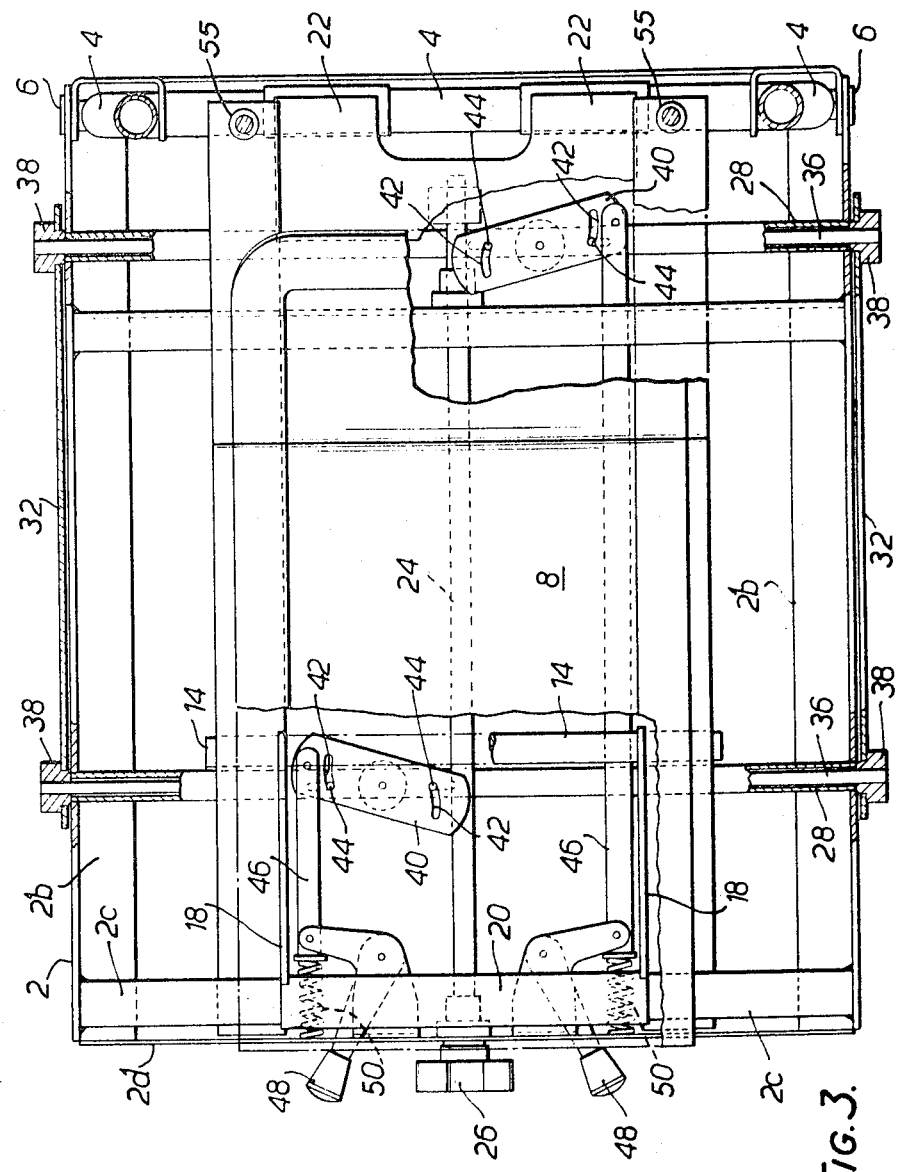

VEHICLE SEATS

This invention relates to seats for vehicles, and in particular to suspension seats of the type in which both a seat part and a back part are resiliently mounted in a frame to damp the transmission of vibration from the vehicle to the occupant of the seat.

In one suspension seat of this type, the seat part is hinged adjacent its front edge to a fixed seat frame, and the back part is slidable upwardly nd downwardly within a back frame which is pivoted about a horizontal axis to the seat frame to permit the inclination of the back part to be varied. In this particular seat, the rearward end of the seat part and the lower end of the back part are hinged together, and the back part is suspended from the back frame through springs which thus provide the resilient support both for the back part and the seat part.

One disadvantage of this form of seat is that, being hinged for movement about the front edge of the seat, violent upward and downward movement of the vehicle may result in upward and downward movement of the vehicle may result in upward and downward movement of the seat occupant relative to the floor of the vehicle with the result that the seat occupant could lose control of the vehicle. It is recognized, in this connection, that the seat occupant can best maintain control of his vehicle when the movement of the seat part is pivotal about an axis forward of the front edge of the seat, and in particular with the axis passing through the knees of the seat occupant.

According to the invention there is provided a seat for a vehicle, said seat comprising a seat part supported in a first frame, and a back part resiliently supported in a second frame pivotally connected to said first frame, the said seat part being resiliently mounted in said first frame for pivotal movement about a horizontal axis and for generally vertical movement.

Further according to the invention there is provided a seat for a vehicle said seat comprising a seat-part-supporting frame, a variable inclination back-part-supporting frame pivotally connected to the seat-part-supporting frame, a seat part resiliently mounted in the front portion of the seat part-supporting frame both for pivotal movement about a horizontal axis extending transversely to the longitudinal axis of the seat and for vertical movement relative to said seat-part-supporting frame, and a back part resiliently mounted in the back-part-supporting frame.

An embodiment of a seat in accordance with the present invention, will now be described with reference to the accompanying drawings, in which:

FIG. 3 is a plan view, partially in section, of the seat part of the seat shown in FIG. 1.

Figure 1:
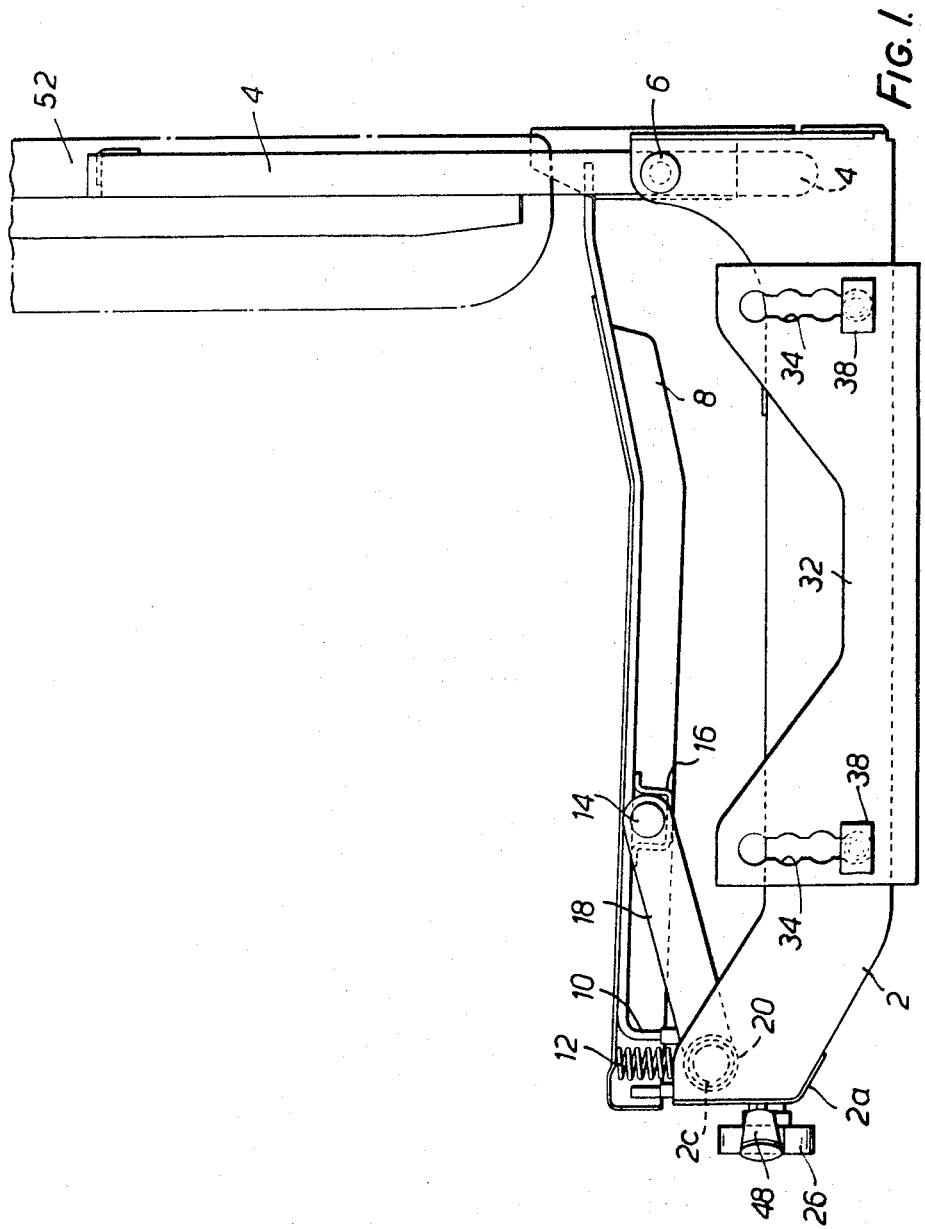
FIG. 1 is a side elevation of a seat in accordance with the invention.

As shown in the drawings, the vehicle seat, which is a modification of the known form of seat hereinbefore referred to, comprises a seat-part-supporting frame 2 (hereinafter referred to as the seat frame) and a tubular back-part-supporting frame 4 (hereinafter referred to as the back frame). The seat frame 2 comprises a front plate 2a, longitudinally extending opposed side plates 2b and a tubular member 2c extending horizontally between the side plates 2b at the front of the frame. The back frame is pivotally connected to the seat frame by pins 5 for pivotal movement about a horizontal axis.

A seat part 8 which is shown in the form of a sheet metal pan to which a cushion can be attached is connected to the tubular member 2c by means of spaced-apart U-shaped couplings 10 which embrace the tubular member and are connected at their upper ends to the seat part. One or more compression springs 12 are interposed between the underside of the seat part and the tubular member 2c to permit upward and downward resilient movement of the front edge of the seat part relative to the seat frame. In this way the movement of the front edge of the seat part will not be a pure pivotal movement about the front edge of the seat frame but will be partly pivotal and partly translational in a generally vertical direction. Since the translational component of motion will be determined by the upward and downward movement of the legs of the seat occupant, the movement of the seat part will be pivotal about a horizontal axis through the knees of the seat occupant.

To promote lateral stability of the seat part 8 about the longitudinal axis of the seat within the seat frame 2, there is provided a torsion bar 14 extending through spaced bearings 16 on the underside of the seat part. Fast with the opposed end portions of the torsion bar 14 are arms 18. The free end portion of each arm is rotatably journaled on the tubular member 2c by means of sleeves 20.

In order to facilitate adjustment of the inclination of the back part of the seat, the back frame 4 extends downwardly below its pivotal connection to the seat frame 2, and a yoke 22 attached to the frame 4 is threadedly mounted on one end of a tie rod 24 journaled in the front plate 2a of the seat frame. A knob 26 is provided on the end of the tie rod 24 adjacent the front edge of the seat part where it is readily accessible to the seat occupant. Thus rotation of the knob and hence the tie rod will move the yoke 22 forward or rearward thereby varying the inclination of the back part of the seat.

The seat frame is supported in a height-adjustment frame, the latter comprising front and rear crossbars 28 rigidly connected to the seat frame. Extending along the sides of the seat and supported by the floor of the vehicle, are a pair of parallel plates 32. Each plate 32 is provided with front and rear vertical slots 34 in alignment with the front and rear crossbars respectively. Each slot 34 is enlarged at vertically spaced intervals to provide circular openings, these circular openings being at corresponding heights in each of the four slots and receiving the two crossbars therein.

Each crossbar 28 includes a pair of axially movable inner rods 36 of such a size as to be vertically movable within the vertical slots 34. The free end of each of the rods 36 extends through one of the slots 34 and carries a conical locking member 38 which fits closely within each of the circular openings in the respective slot to prevent vertical movement of the respective crossbar. To permit vertical movement of the crossrods, each rod 36 can be moved axially outwardly from the respective crossbars so that the conical locking members 38 are moved clear of the circular openings. Axial movement of the rods 36 within each of the crossbars 28 is effected by means of cam plates 40 journaled within the seat frame 2. Each cam plate 40 includes a pair of arcuate slots 42 each of which receives a pin 44 rigid with one of the rods 36. The arcuate slots in each cam plate are arranged so that rotation of the cam plate in one sense moves the rods 36 in the respective crossbar towards each other and movement of the cam plate in the reverse sense, moves the rods 36 relatively apart. Each cam plate is rotated through a linkage 46 from a bellcrank 48 journaled in the seat frame. One arm of each bellcrank 48 extends through the front plate of the seat frame where it is readily accessible by the occupant of the seat. As can be clearly seen, the rods 36 in the front and rear crossbars are independently operable so that movement of the front part of the frame can be independent of the movement of the rear part of the frame. Thus the seat frame can be raised by equal or unequal amounts at the front and back of the seat. The linkages 46 are biased by springs 50 to urge the conical members 38 into locking engagement with the circular openings in the slots 34.

Figure 2:
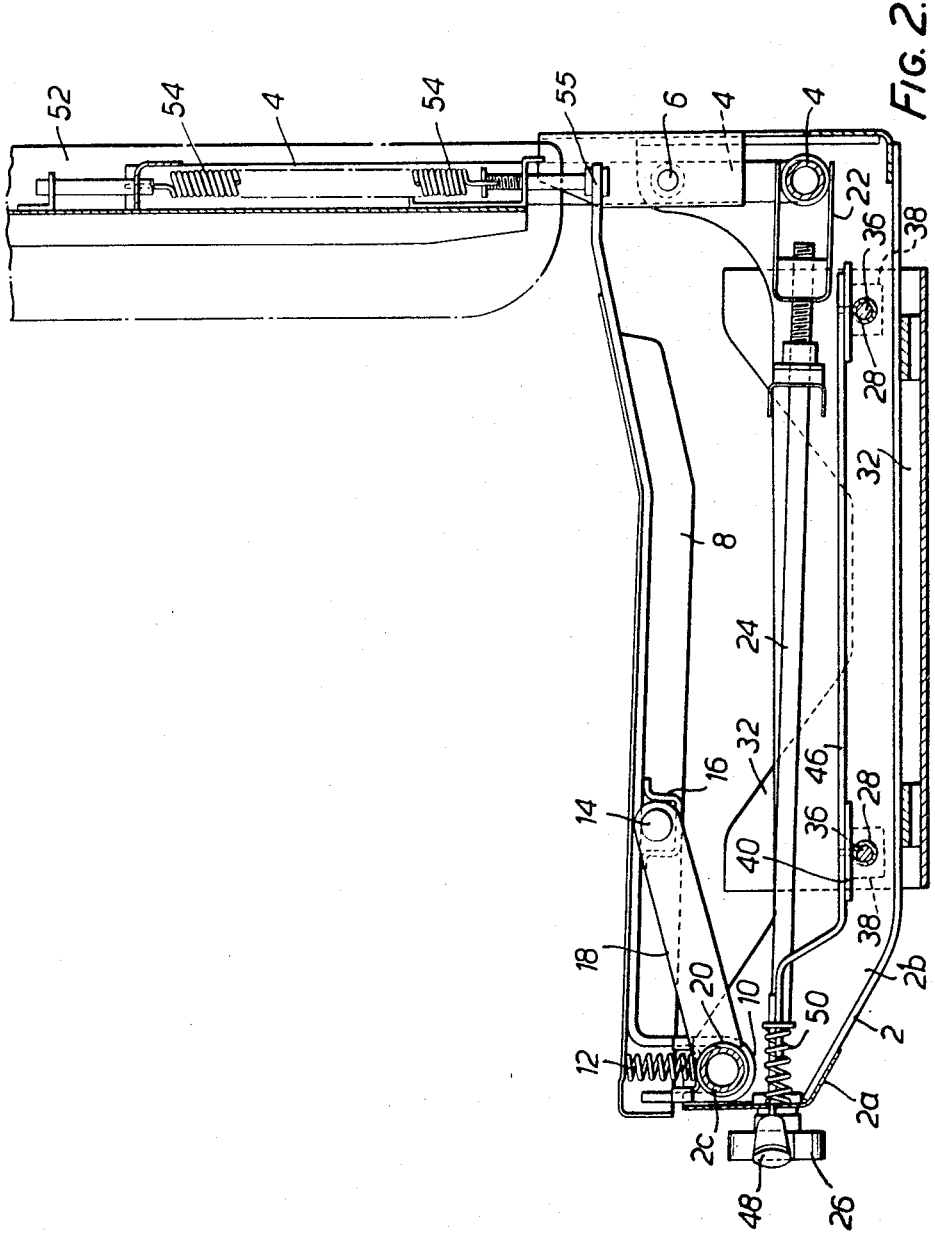
FIG. 2 is a side elevation, in section, of the seat shown in FIG. 1.

The back part 52 of the seat is suspended from the back frame 4 of the seat by springs 54 in known manner as shown in FIG. 2. Preferably the tension in the springs 54 can be adjusted by means of a screw (not shown). The rear portion of the seat part 8 is connected to the back part 52 at 55 in known manner as clearly shown in FIGS. 2 and 3 and is supported thereby.

I claim as my invention:

1. A seat for a vehicle, said seat comprising a seat part supported in a first frame, and a back part resiliently supported in a second frame connected to and supported by said first frame, the said seat part being supported at its rear portion by said back part and at its front portion by a pair of rearwardly extending arms mounted at their forward ends to said first frame and at their rearward ends to said seat part at points spaced from the front edge of said seat part, said arms being rigidly joined to each other at their rearward ends by an elongated bar whereby downward pressure applied to one arm will be transmitted to the other, and resilient means urging the front edge of said seat part upwardly relative to said frame.

2. A seat according to claim 1 wherein said second frame is pivotally connected to said first frame.

3. A seat according to claim 1 wherein said arms are pivotally mounted to said first frame by means of a sleeve member which surrounds a tubular member extending between the sides of the first frame.

4. A seat according to claim 3 wherein said resilient means comprise compression spring means interposed between the bottom of said seat part and said tubular member, the movement of said tubular member relative to said seat part by said resilient means being limited by a plurality of elongated members affixed to the underside of said seat part, said elongated members having U-shaped end portions disposed around said tubular members.

5. A seat according to claim 1 wherein said elongated bar is a torsion bar operable to stabilize movement of the seat part about the longitudinal axis of the seat.

6. A seat according to claim 1 and further including an additional frame extending along the sides of said first frame, said first frame being supported by said additional frame and vertically adjustably positioned relative thereto by means of independently operable front and rear crossbars which are lockingly engageable with vertical slots in said additional frame.

* * * * *